United States Patent
Li et al.

(10) Patent No.: US 9,426,370 B2
(45) Date of Patent: Aug. 23, 2016

(54) IMAGE CAPTURING DEVICE AND EXPOSURE TIME ADJUSTING METHOD THEREOF

(75) Inventors: Yun-Chin Li, New Taipei (TW); Yu-Ming Cheng, Hsinchu (TW); Chin-Lung Yang, Toufen Township, Miaoli County (TW)

(73) Assignee: Altek Corporation, Hsinchu (TW)

( * ) Notice: Subject to any disclaimer, the term of this patent is extended or adjusted under 35 U.S.C. 154(b) by 1076 days.

(21) Appl. No.: 13/019,471

(22) Filed: Feb. 2, 2011

(65) Prior Publication Data
US 2012/0120263 A1     May 17, 2012

(30) Foreign Application Priority Data
Nov. 16, 2010   (TW) ................................ 99139353 A

(51) Int. Cl.
*H04N 5/235*   (2006.01)
*H04N 5/232*   (2006.01)

(52) U.S. Cl.
CPC ......... *H04N 5/23258* (2013.01); *H04N 5/2327* (2013.01)

(58) Field of Classification Search
CPC ........................... H04N 5/232; H04N 5/23248
See application file for complete search history.

(56) References Cited

U.S. PATENT DOCUMENTS

| | | | | |
|---|---|---|---|---|
| 2007/0159658 A1* | 7/2007 | Kato | .................. | H04N 1/00453 358/3.21 |
| 2009/0091633 A1* | 4/2009 | Tamaru | ..................... | G02B 7/38 348/208.14 |
| 2009/0207279 A1* | 8/2009 | Ochi | .................. | H04N 5/23219 348/231.99 |
| 2010/0128146 A1* | 5/2010 | Nojima | .................. | G03B 13/36 348/231.99 |
| 2010/0214426 A1* | 8/2010 | Kimura | ................ | G02B 27/646 348/208.99 |
| 2011/0090372 A1* | 4/2011 | Doida | ..................... | G06T 5/008 348/239 |
| 2012/0007996 A1* | 1/2012 | Bilcu | .................. | H04N 5/23258 348/208.2 |
| 2012/0274795 A1* | 11/2012 | Tanaka | ................ | H04N 5/23248 348/208.6 |
| 2013/0120603 A1* | 5/2013 | Yamazaki | ................ | G03B 5/00 348/220.1 |
| 2014/0055629 A1* | 2/2014 | Ochi | .................. | H04N 5/23219 348/208.1 |

* cited by examiner

*Primary Examiner* — Aung S Moe
*Assistant Examiner* — John H Morehead, III
(74) *Attorney, Agent, or Firm* — Wang Law Firm, Inc.

(57) ABSTRACT

The present invention discloses an image capturing device and an exposure time adjusting method thereof. The image capturing device comprises an image capturing module, a processing module and an image integrated module. The image capturing module is used to capture a plurality of temporary images. While the image capturing module captures the temporary images, the processing module dynamically adjusts the exposure times of the temporary images according to a predetermined file, a plurality of analysis results of the temporary images or the vibration information sensed by a vibration sensor. Next, the image integrated module controlled by a control module in the processing module integrates the temporary images to generate a stored image.

14 Claims, 6 Drawing Sheets

IMAGE CAPTURING DEVICE AND EXPOSURE TIME ADJUSTING METHOD THEREOF

FIELD

The present invention relates to an image capturing device and an exposure time exposure time adjusting method thereof; in particular, the present invention relates to an image capturing device and an exposure time exposure time adjusting method thereof enabling enhancements of image quality.

BACKGROUND

While user operating a digital camera to take pictures, the problem of blurred images due to vibrations in hand has been beleaguering numerous photographers all the time. Generally speaking, when holding a conventional digital camera by a user in hand for photographic operations, before a picture is taken, the lens may be swung or moved because of accidental carelessness or incorrect gesture in holding the digital camera. Additionally, as the size for the digital camera becomes slimmer, the occurrence of blurred images caused by hand shakes when pressing down the shutter button on a compact digital camera also gets more commonly seen. Consequently, hand shakes could adversely influence the quality of taken pictures to a certain extent; for minor cases, the scene angle in the picture may slant or deviate; under more serious condition, the entire image can be blurred and obscured.

Several traditional anti-shake approaches have been developed and comprehensively applied to address to such an issue, including: (1) elevation of sensitivity in the photosensor (e.g., Charge-Coupled Device, CCD or Complementary Metal-Oxide-Semiconductor, CMOS) so as to reduce the required exposure time thereby curtailing the possibility in occurrence of blurred images. (2) application of optical anti-shake technique to move in real-time the lens or sensor in order to compensate for the offset in optical axis generated by hand shakes. Each of the aforementioned approaches has respective advantages and drawbacks, but with regards to current consumption trend, the first solution gets more widely implemented; however, since a picture is taken through increased sensitivity, an image of high noise is very likely generated. Therefore, a technology of multi-exposure image integration has been applied in recent years for reduction of noise in output images.

So far, the application of multi-exposure method for reducing high noises needs to first capture a series of images at high sensitivity regarding to a specific scene, and select a reference image among them, and perform geometric movement estimations on the rest captured images based on the selected reference image thereby finding the geometric conversion parameters between the other images and the reference image. Each of the other images are converted in accordance with the estimated motion parameters so that each image can be integrated in a point-to-point fashion with the selected reference image, and some integration techniques are used to integrate relevant image points distributed across such images into an image of low noises.

However, by applying this method, effective integration of high quality image may not be successfully achieved due to erroneous estimations of geometric conversion parameters in certain images and much noise in each input image, thus resulting in images of even worse quality. Also, at present, this method essentially uses the same exposure approach to acquire each image: for example, first determining an exposure time for a certain scene, and then applying the minimum secure shutter time to equivalently decide the number of images to take; whereas, more images it captures, the longer time the system needs for required processes, thus less reliable in the quality of output images after integration. As such, regarding to the aforementioned issues, it now becomes an urgent subject for the market applications in terms of demand to design an image capturing device and an exposure time adjusting method thereof which can effectively increase the image quality.

SUMMARY

With regards to the issues found in prior art as illustrated hereinbefore, the objective of the present invention is to provide an image capturing device and an exposure time adjusting method thereof thereby resolving the problems in required long processing time of multiple images for currently available image capturing devices as well as unsatisfactory effects in image integrations.

According to the objective of the present invention, an image capturing device is herein provided which comprises an image capturing module, a processing module and an image integrated module. The image capturing module is used to capture a plurality of temporary images. While the image capturing module captures the temporary images, the processing module dynamically adjusts the exposure time for each of the temporary images according to a predetermined file or a photographic condition. The image integrated module is controlled by the processing module thereby integrating the temporary images to generate a stored image.

According to the objective of the present invention, an exposure time adjusting method is provided which is applicable to an image capturing device. The exposure time adjusting method comprises the following steps. Pluralities of temporary images are captured by using an image capturing module. while the image capturing module capturing the temporary images, the exposure time for each of the temporary images are dynamically adjusted according to a predetermined file or a photographic condition by a processing module. The temporary images are integrated by an image integrated module to generate a stored image.

Preferably, the exposure time for each of the temporary images is the secure shutter time for each of the temporary images.

Preferably, the image capturing device can further comprise a storage module capable of storing the predetermined file which includes the stability parameter concerning the use of the image capturing device by a plurality of users.

Preferably, the image capturing device can further comprise an image analysis module capable of analyzing the clarity in each of the temporary images and correspondingly providing an image analysis result that indicates the photographic condition.

Preferably, the image capturing device can further comprise a vibration sensor module capable of sensing the vibration state in the image capturing device and correspondingly providing the vibration information that indicates the photographic condition.

Preferably, the vibration information can comprise vibration amplitude, vibration frequency and vibration duration.

Preferably, upon the vibration amplitude or the vibration frequency surpassing a threshold, the processing module controls the image capturing module to stop the exposure of the current temporary image and controls the image capturing module to perform the exposure of another temporary image.

Preferably, the processing module controls the image integrated module to integrate each pixel in the same image object among such temporary images to generate the stored image.

Preferably, when the image integrated module determines that the difference in similarity from pixels of an image object between a certain temporary image and other temporary images exceeds a threshold, the image integrated module stops integrating such a temporary image and completes the integration for each of the other temporary images.

According to the objective of the present invention, an image capturing device is herein further provided which comprises an image capturing module and a processing module. The image capturing module captures a corresponding image data based on a scene. The processing module controls the image capturing module to capture a plurality of transient, continuous images and the processing module dynamically divides the exposure time for each of the transient, continuous images captured by the image capturing module, and each of the transient, continuous images is a clear image; furthermore, the processing module comprises a control module to determine a compensation value for vibrations in the transient, continuous images and integrates the transient, continuous images based on the compensation value to generate a stored image.

Herein the exposure time for each of the transient, continuous images is the secure shutter time for each of the transient, continuous images.

As described in previous texts, the image capturing device and exposure time adjusting method thereof according to the present invention provides the following advantages:

The image capturing device and exposure time adjusting method thereof according to the present invention allows adaptively controlling the exposure time for each image based on various photographic conditions so as to reduce the processing time for multiple images in the image capturing device or portable electronic device with camera function and improve the quality of integrated images.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

In the subsequent texts, references will be made to relevant drawings in order to describe the embodiments for the image capturing device and exposure time adjusting method thereof according to the present invention, and for better appreciations, the same components in the following embodiments will be marked with the identical symbols/numerals throughout the entire specification.

The digital capturing device set forth in the present invention may be a portable electronic device featuring camera function such as a digital camera, a camera phone, a personal digital assistant (PDA) or a digital video camera and the like; whereas to facilitate more thorough understanding of the present invention, hereunder a camera phone is taken as an illustrative embodiment, but the present invention is by no means limited thereto.

Figure 1:
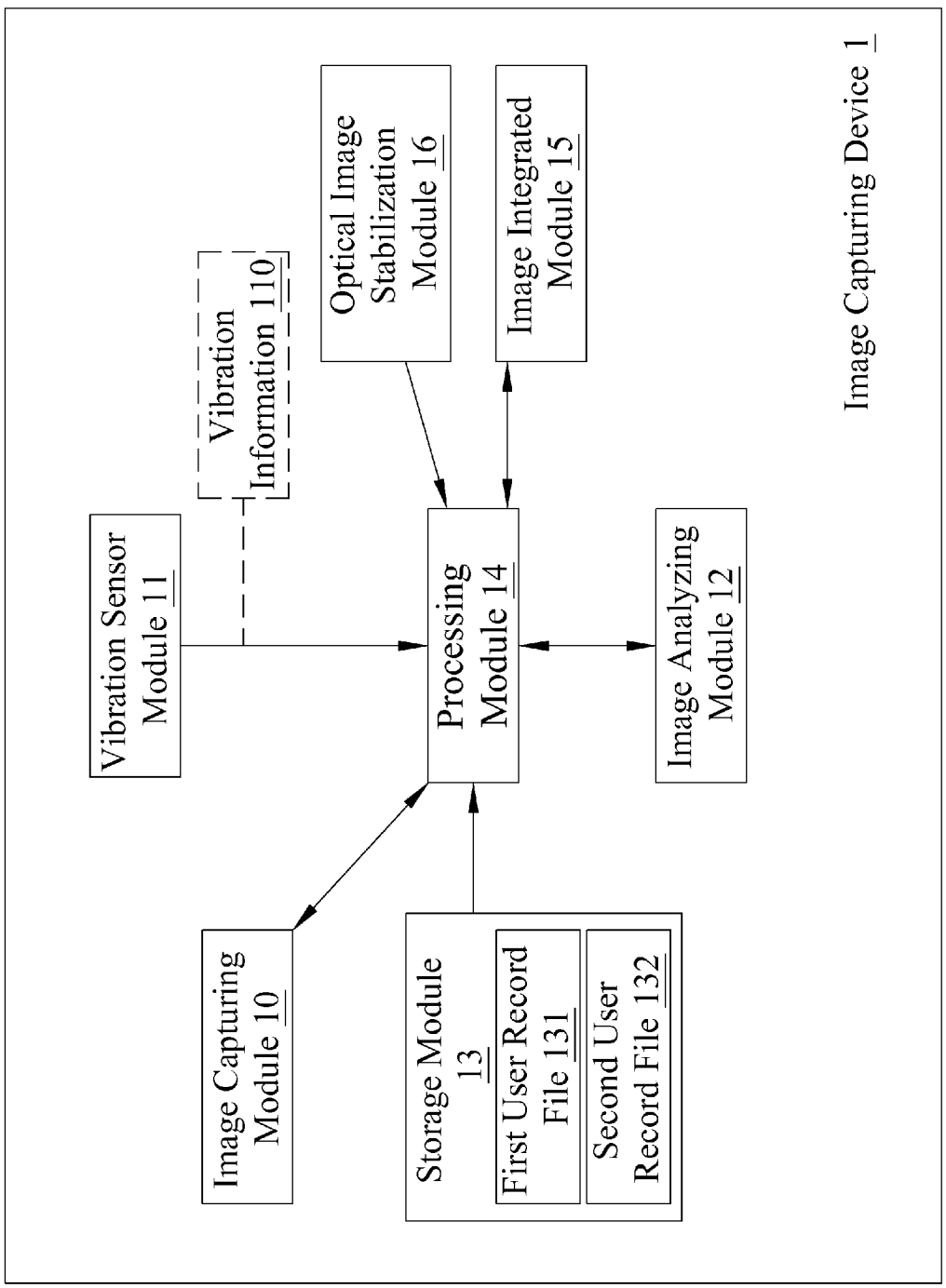
FIG. 1 shows a block diagram for an embodiment of the image capturing device according to the present invention.

Refer to FIG. 1, wherein a block diagram for an embodiment of the image capturing device according to the present invention is shown. As depicted, the image capturing device 1 according to the present invention comprises an image capturing module 10, a vibration sensor module 11, an image analyzing module 12, a storage module 13, a processing module 14 and an image integrated module 15. The image capturing module 10 can be used to capture an image and generate the image data. The image capturing module 10 may include a lens, a sensor like a Complementary Metal-Oxide-Semiconductor (CMOS) or a Charge-Coupled-Device (CCD), an analog/digital circuit and an image processor etc. The vibration sensor module 11 senses the vibration data occurring in the image capturing device 1, which can be a gyro sensor, an acceleration sensor or a combination thereof. The image analyzing module 12 receives and analyzes the information about the temporary image captured by the image capturing device 1. The storage module 13 is capable of storing a plurality of user record files 131, 132, which can be an embedded memory, an externally connected memory card or a combination thereof.

The processing module 14 is electrically connected to the image capturing module 10, the vibration sensor module 11, the image analyzing module 12 and the storage module 13, which can be a central processing unit (CPU) or a microprocessing unit. The processing module 14 controls the image capturing module 10 to capture a plurality of temporary images of a scene, and during capturing such temporary images by the image capturing module 10, the processing module 14 can dynamically adjust the exposure time for each of the temporary images in accordance with a predetermined file or a photographic condition. After which, the processing module 14 controls the image integrated module 15 to integrate the plurality of temporary images and generate a stored image to be stored in the storage module 13.

Figure 2:
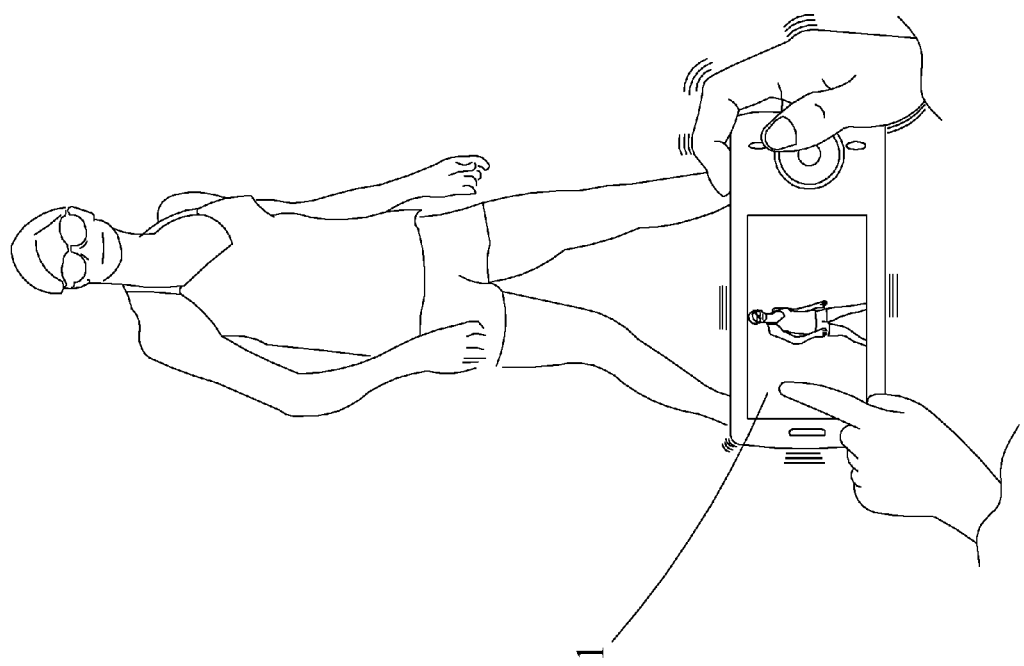
FIG. 2 shows a schematic diagram for an embodiment of the image capturing device according to the present invention.

Refer to FIG. 2, wherein a schematic diagram for an embodiment of the image capturing device according to the present invention is shown. As depicted, the image capturing device 1 according to the present invention can be a camera phone. Refer in conjunction with FIG. 1, wherein, during the employment of the image capturing device 1 for image capturing processes by a user, there are essentially two major stages: the first stage is the pre-configuration estimation of the image capturing (commonly named as stage S1), and the second stage is the implementation of the image capturing (commonly named as stage S2). During the stage S1, the vibration sensor module 11 is able to estimate the stability of the user as taking pictures according to the degree of vibration in the image capturing device 1, while the image capturing device 1 can suitably adjust its initial exposure time based on different degree of vibration (which in the present embodiment can be a secure shutter). Then, afterward in the stage S2, the image capturing device 1 starts to activate the shutter for exposure thereby performing image capturing processes.

In case that the user intends to perform integration of multiple images so as to enhance the quality of integrated image, it is possible to get an appropriate initial exposure time in the stage S1. Upon entering into the stage S2, the image capturing device 1 takes pictures with the initial exposure time adjusted during the stage S1, and since the hand shake may be at its maximum when pressing down the shutter button by a general user in operation of the camera phone, the vibration sensor module 11 detects the vibration state of the image capturing device 1 within a preset range of time after pressing down the shutter button for the first time (e.g., within 1 second after pressing down the shutter button), correspondingly generates the vibration information 110 including the vibration amplitude, vibration frequency and vibration duration and transfers it to the processing module 14. Then the processing module 14 may immediately perform statistic analyses on the received vibration information 110. As continuing to take a second temporary image, in case the vibration state in the first temporary image is more stable than expected vibration state, it determines that sufficient stability exists in the user, thus allowable to capture the next temporary image at the same or slightly longer shutter time; on the contrary, suppose the vibration state in the first temporary image is less stable than expected vibration state, the image capturing device 1 can adaptively reduce the shutter time for the next temporary image so as to capture a lucid image. The expected vibration state can be determined, not limited, in the stage S1 or other manner described latter. In other word, such a mechanism of dynamic modification on exposure time determines the exposure time for the next temporary image based on the vibration information 110 detected by the vibration sensor module 11 such that, for a user enabling sufficient stability, it is possible to perform image integrations with less temporary images thereby successfully achieving the pre-determined integration brightness. However, for a less stable user, it needs to capture more temporary images to reach at the pre-determined integration brightness.

Besides, because of continuous detection by the vibration sensor module 11, the image capturing device 1 is capable of monitoring the output data from the vibration sensor module 11 during the image exposure. When the momentary variation in its output becomes exceedingly strong and beyond a generally acceptable range, it indicates that the image capturing device 1 is seriously swung and the captured image is definitely obscure, and the image capturing device 1 or user may stop the exposure right away in order to maintain the limpidity in the output image as much as possible, and then immediate recapture the next image with a reduced initial exposure time thereby ensuring the clarity in the captured image; consequently, through the vibration sensor module 11, the user can detect in real-time the degree of vibration in the image capturing device 1 rather than waiting till completion of photographic operation to find out.

Figure 3:
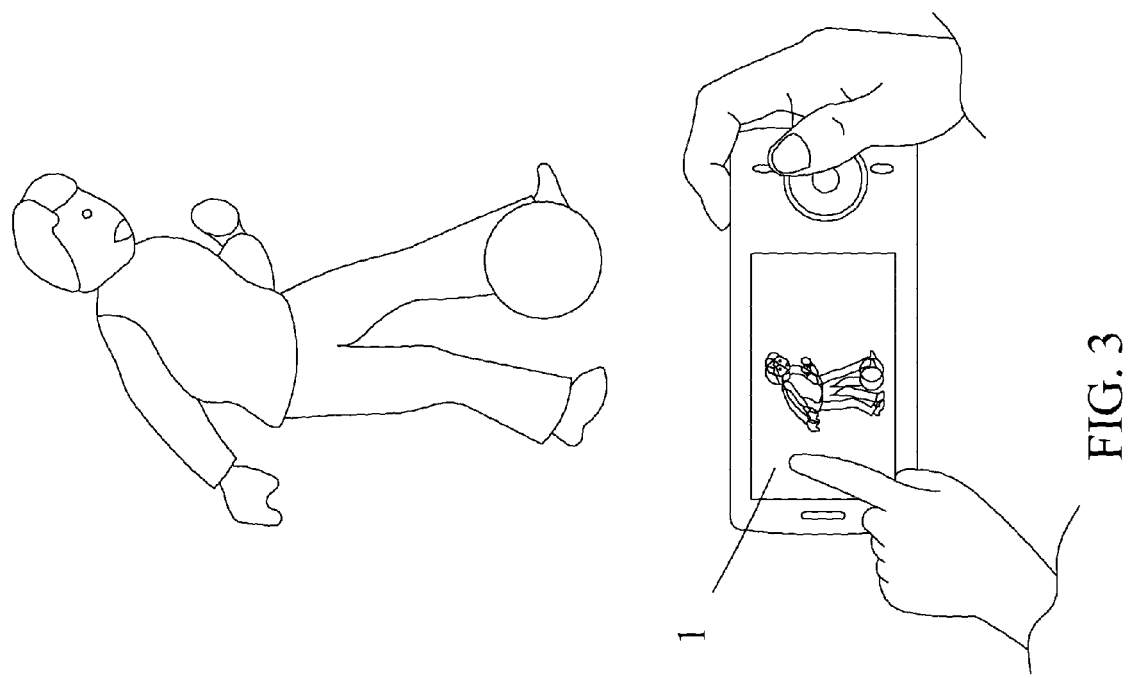
FIG. 3 shows a schematic diagram for another embodiment of the image capturing device according to the present invention.

Refer to FIG. 3, wherein a schematic diagram for another embodiment of the image capturing device according to the present invention is shown. Refer in conjunction with FIG. 1, wherein, in case a user intends to perform integration of multiple images so as to enhance the quality of integrated image, it is possible to get an appropriate initial exposure time in the stage S1 as described previously. After entering into the stage S2, the image capturing device 1 at start can take the first temporary image with the initial exposure time adjusted during the stage S1. Meanwhile, the image analyzing module 12 can analyze and process the clarity of the first temporary image. If the clarity identified in the first temporary image matches the expected sharpness, such as a predetermined sharpness parameter, it is determined that the user is sufficiently stable, thus the image capturing device is allowable to capture the next temporary image at the same or slightly longer shutter time; contrarily, suppose the sharpness thereof is less than expected sharpness, it is determined that the user does not enable enough stability and the image capturing device 1 can adaptively reduce the shutter time for the next temporary image so as to capture a clear image. That is, such a mechanism of dynamic modification on exposure time determines the exposure time for the next temporary image in accordance with the image clarity analyzed by the image analyzing module 12 such that, for a user enabling sufficient stability, it is possible to perform image integrations with less temporary images thereby successfully achieving the pre-determined integration brightness. However, for a less stable user, it needs to capture more temporary images to reach at the pre-determined integration brightness.

Refer to Table 1, wherein an example of record file for different users is shown. As shown in Table 1, the image capturing device 1 can respectively learn and record the habit or stability with respect to different users to store in the storage module 13. In the present embodiment, the record file for different users can be presented in a way of form (user 1 and user 2 as shown), which includes the hand shake condition of the user such as vibration amplitude, vibration frequency and vibration duration, as well as parameters for each image capturing mode given according to the habit of different users after analyses through the processing module 14. For example, to a sufficiently stable user, an exposure time longer than normally set can be granted at the initial point; but, for a user not able to demonstrate enough stability, an exposure time shorter than normally set can be given initially. After which, during the following photographic period of temporary images, the image capturing device 1 can dynamically adjust its shutter time in conjunction with the aforementioned analyses on vibration or image clarity. Also, such a user record file may be composed of include fixed contents or consistently modified according to actual operations. For brevity, only partial parameters for the image capturing mode are listed in present diagram, while those skilled ones in the art can conveniently add the remaining relevant parameters which are herein omitted.

TABLE 1

Example of User Record File for Different Users

| | Vibration Information | | | | Image Capturing Mode | |
|---|---|---|---|---|---|---|
| | Vib. Amp. | Vib. Fre. | Vib. Du. | ... | Expo. Time | ... |
| User 1 | 5 | 2.5 | 1 | | +15% | |
| User 2 | 4 | 3.5 | 0.8 | | −10% | |

It should be noted that, in addition to the above-said fashion, the user record file stored by the vibration sensor module 11, image analyzing module 12 and storage module 13 can also apply individual functions to dynamically adjust the exposure time for each of the temporary images. However, those skilled ones in the art can conveniently consider other conjunctive or combinatorial approaches thereby enabling dynamic adjustments on the exposure time for each of the temporary images, and the actions of such combinations are analogous to those as previously illustrated which will be herein omitted for brevity.

Figure 4:
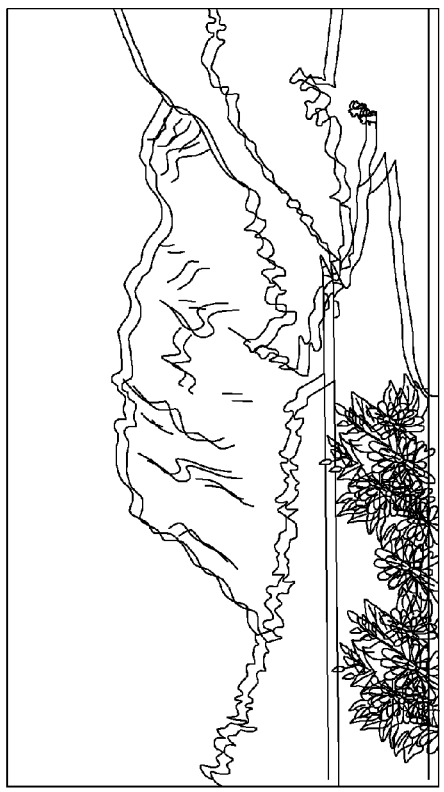
FIG. 4 shows an operational diagram for an embodiment of an optical image stabilization module in the image capturing device according to the present invention.
Figure 4:
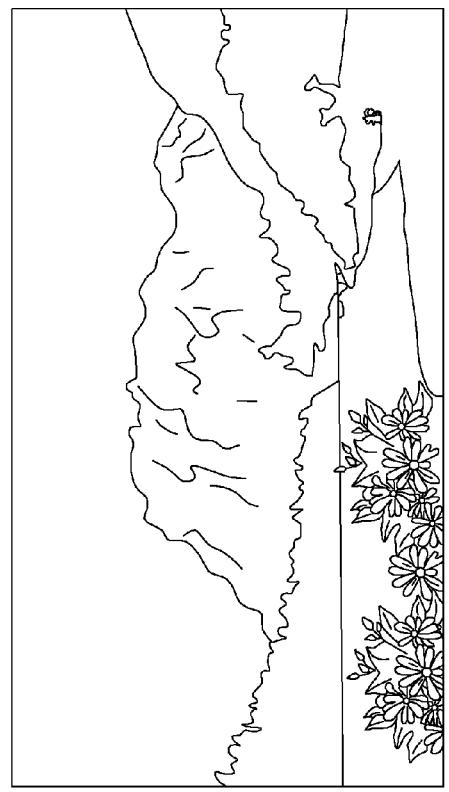

Refer subsequently to FIG. 4, wherein an operational diagram for an embodiment of an optical image stabilization module in the image capturing device according to the present invention is shown. In the present embodiment, the image capturing device 1 according to the present invention can further comprise an optical image stabilization module 16 which, based on the operating range and tracking capability in the optical image stabilization module 16, combines the aforementioned vibration sensor module 11, image analyzing module 12 and user record file to integrate multiple images so as to further extend the stability range for clear image capturing (as shown in lower part of FIG. 4) from an original stability range of blurred image (as shown in upper part of FIG. 4). That is, in case it is within the normal operating range of the optical image stabilization module 16, the optical image stabilization module 16 is used to take pictures; whereas, when it exceeds the operating range and tracking capability of the optical image stabilization module 16, the range that the optical image stabilization module 16 capable of acts as the least exposure time (i.e., effective secure shutter), and since the exposure time that the optical image stabilization module 16 can deal with is higher than general secure shutters, the combination with the feature of the optical image stabilization module 16 in itself thus allows to capture images at much longer exposure time. Upon using the optical image stabilization module 16 to track the degree of vibration in the image capturing device 1, the user can also appreciate whether the optical image stabilization module 16 are able to catch up through the vibration sensor module 11 and the tracking system thereof, and the photographic operation can be dynamically halted once the optical image stabilization module 16 is found to be unable to catch up because its output images will be obscured, so the user can efficiently take newer and more lucid temporary images for subsequent integrations.

It should be collaterally mentioned that, in integrating the temporary images, if it is found that a temporary image fails to correctly integrate with a reference temporary image; that is, in estimating geometric conversion parameters between the temporary image and the selected reference temporary image, effective integration can not be successfully completed due to excessive errors, or otherwise the integration fails because of overly large errors between the temporary image and the reference temporary image caused by dramatic variations of a local object in the temporary image, the image capturing device 1 can integrate those temporary image allowable for correct integrations and discard the temporary image unable to be integrated. Although the brightness in the stored image finally integrated may be less than expected, the user can compensate the brightness in the stored image by means of image processing techniques so as to achieve the desired goal. Besides, suppose the error among such temporary images originates from the variation of a local object, the user may decide whether to continue to take pictures according to the magnitude of the error; if such a local variation actually occupies just a relatively small area, then the user can continue the photographic operation and eliminate the local error through de-ghosting methods. In this way, integral output image quality can be still enhanced.

Figure 5:
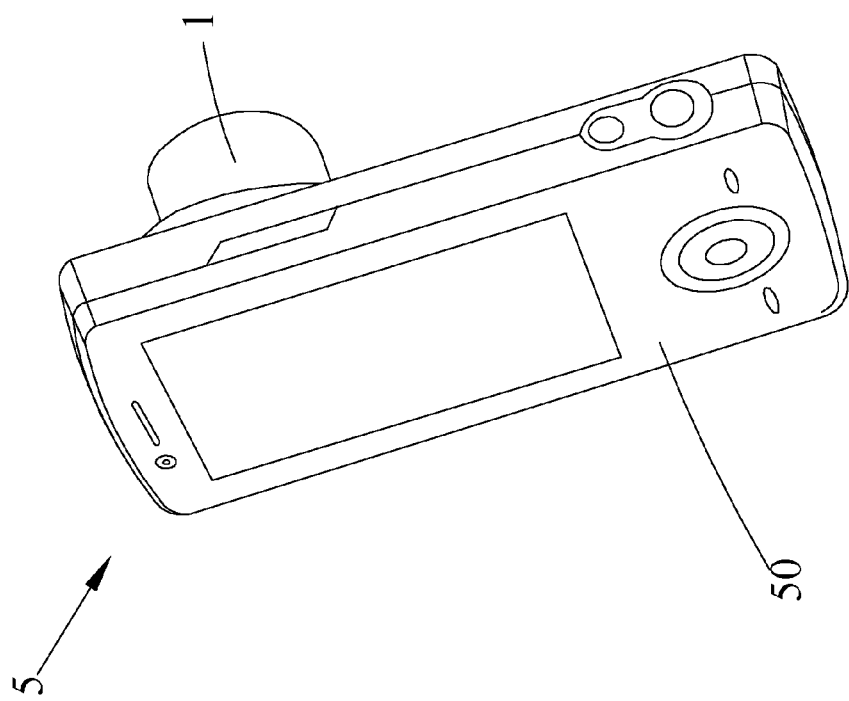
FIG. 5 shows a schematic diagram for an embodiment of an electronic device enabling image capturing function according to the present invention.

Refer to FIG. 5, wherein a schematic diagram for an embodiment of an electronic device enabling image capturing function according to the present invention is shown. As depicted, the electronic device 5 according to the present invention comprises a body 50 as well as an image capturing device 1 including an image capturing module 10, a vibration sensor module 11, an image analyzing module 12, a storage module 13, a processing module 14 and an image integrated module 15. Detailed descriptions concerning the image capturing device 1 have been illustrated as above, and will be herein omitted for brevity. However, it should be noted that the electronic device 5 according to the present invention can be various mobile portable devices, such as a multi-media player enabling camera function, a cellular phone enabling camera function, a smart phone, a navigator or a personal digital assistant (PDA) etc. In the present embodiment, the electronic device 5 according to the present invention takes a smart phone as an example which can be embedded with the image capturing device 1 according to the present invention for taking pictures, so, when taking pictures, the user can select the user record file included therein through an input device installed on the smart phone, such as a touch screen or a physical button and the like, the electronic device 5 can capture temporary images in conjunction with the aforementioned vibration sensor module 11, image analyzing module 12 and optical image stabilization module 16 and dynamically adjust the exposure time for each of the temporary images. The photographic processes and conditions can be further recorded as well for later persistent modifications on the user record file. In this way, the process time for integration on multiple temporary images can be effectively reduced. The smart phone set forth in the present embodiment is merely exemplary but not restrictive, and those skilled ones in the art can conveniently substitute with other devices to operate conjunctively with the image capturing device 1 according to the present invention as previously described.

Although the concept about the exposure time adjusting method for the image capturing device according to the present invention has been explained together with the descriptions on the operational processes of the image capturing device, to facilitate more thorough understanding, a flowchart thereof is additionally depicted hereunder for detailed illustrations.

Figure 6:
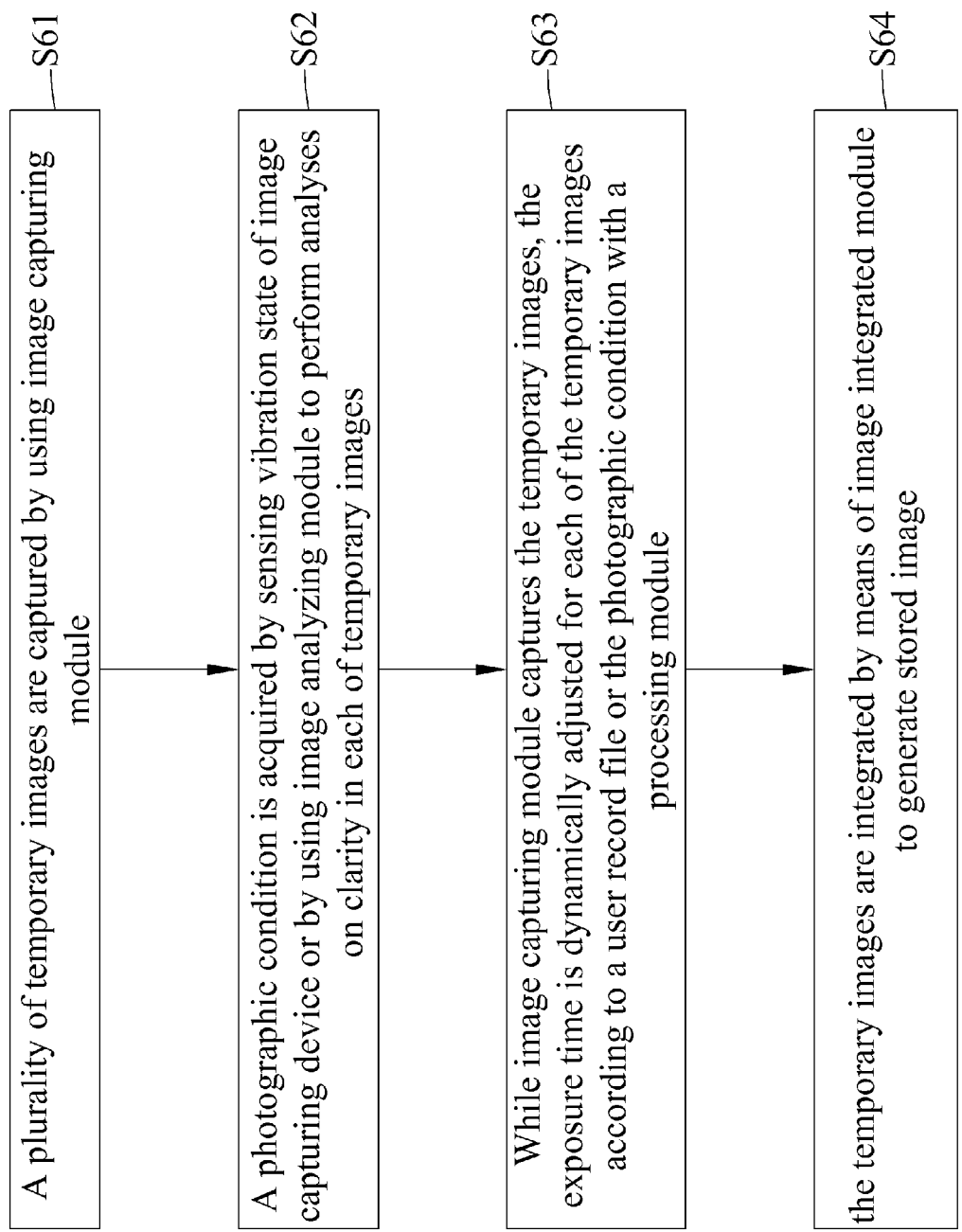
FIG. 6 shows a flowchart for an embodiment of the exposure time adjusting method according to the present invention.

Refer to FIG. 6, wherein a flowchart for an embodiment of the exposure time adjusting method according to the present invention is shown. As depicted, the exposure time adjusting method according to the present invention applicable to an image capturing device which comprises an image capturing module, a vibration sensor module, an image analyzing module, a processing module and an image integrated module. The exposure time adjusting method for an image capturing device comprises the following steps.

In step S61, a plurality of temporary images are captured by using an image capturing module;

In step S62, a photographic condition is acquired by sensing the vibration state of the image capturing device or using an image analyzing module to perform analyses on the clarity in each of the temporary images;

In step S63, while the image capturing module captures the temporary images, the exposure time is dynamically adjusted for each of the temporary images according to a user record file or the photographic condition with a processing module; and In step S64, the temporary images are integrated by means of an image integrated module to generate a stored image.

The detailed descriptions and implementation approaches concerning the exposure time adjusting method for the image capturing device according to the present invention have been previously illustrated with regards to the image capturing device and electronic device of the present invention which will be herein omitted for brevity.

In summary, the image capturing device and exposure time adjusting method thereof provided by the present invention allows to adaptively control the exposure time for each image based on various photographic conditions so as to reduce the processing time for multiple images in the image capturing device or portable electronic device with camera function and improve the quality of integrated images.

The aforementioned descriptions are exemplary rather than being restrictive. All effectively equivalent changes, alternation or substitutions made thereto without departing from the spirit and scope of the present invention are deemed to be encompassed by the present invention as delineated in the following claims.

What is claimed is:

1. An image capturing device, comprising:
   an image capturing module, capturing a plurality of temporary images;
   a vibration sensor module, sensing a vibration state of the image capturing device and correspondingly providing a vibration information corresponding to each of the plurality of temporary images;
   a processing module, dynamically adjusting exposure times of the temporary images according to a photographic condition indicated by the vibration information during a period of capturing the plurality of temporary images by the image capturing module, wherein the vibration information of one of the plurality of temporary images is utilized to determine the exposure time of next one of the plurality of temporary images; and
   an image integrating module, controlled by the processing module thereby integrating the plurality of temporary images to generate a stored image,
   wherein the processing module controls the image integrating module to integrate pixels of the plurality of temporary images, which correspond to similar image objects, to generate the stored image, and
   when the image integrating module determines that geometric conversion parameters of an image object between a certain temporary image and a selected reference temporary image exceed an error threshold, the image integrating module stops integrating the certain temporary image and completes the integration between the selected reference temporary image and the rest of the plurality of temporary images other than the certain temporary image.

2. The image capturing device according to claim 1, wherein the exposure time for each of the plurality of temporary images is a secure shutter time determined by the exposure time of the processing module for each of the plurality of temporary images.

3. The image capturing device according to claim 1, further comprising a storage module for storing the predetermined file, wherein the predetermined file comprises a stability parameter concerning the use of the image capturing device by a plurality of users.

4. The image capturing device according to claim 1, further comprising an image analyzing module to analyze clarity in each of the plurality of temporary images and correspondingly provide an image analysis result which indicates the photographic condition.

5. The image capturing device according to claim 1, wherein the vibration information includes the vibration amplitude, the vibration frequency and the vibration duration.

6. The image capturing device according to claim 5, wherein, when the vibration amplitude or the vibration frequency exceeds a threshold, the processing module controls the image capturing module to stop the exposure of a current temporary image and controls the image capturing module to perform the exposure of another temporary image.

7. An exposure time adjusting method applicable to an image capturing device, comprising the following steps:
   capturing a plurality of temporary images by an image capturing module;
   sensing a vibration state of the image capturing device and correspondingly providing a vibration information corresponding to each of the plurality of temporary images by a vibration sensor module;
   dynamically adjusting exposure times of the plurality of temporary images according to a photographic condition indicated by the vibration information by a processing module during a period of capturing the plurality of temporary images by the image capturing module, wherein the vibration information of one of the plurality of temporary images is utilized to determine the exposure time of next one of the plurality of temporary images; and
   integrating the plurality of temporary images by an image integrating module to generate a stored image,
   controlling the image integrating module to integrate pixels of the plurality of temporary images, which correspond to similar image objects, to generate the stored image by the processing module; and
   stopping integration of a certain temporary image by the image integrating module while the image integrating module determines that geometric conversion parameters of an image object between the certain temporary image and a selected reference temporary image exceeds an error threshold; and
   completing the integration between the reference temporary image and the rest of the plurality of temporary images other than the certain temporary image by the image integrating module.

8. The exposure time adjusting method according to claim 7, wherein the exposure time for each of the plurality of temporary images is a secure shutter time determined by the exposure time of the processing module for each of the plurality of temporary images.

9. The exposure time adjusting method according to claim 7, wherein the predetermined file contains a stability parameter concerning the use of the image capturing device by a plurality of user.

10. The exposure time adjusting method according to claim 7, further comprising a step:
    analyzing clarity in each of the plurality of temporary images and correspondingly providing an image analysis result that indicates the photographic condition by an image analysis module.

11. The exposure time adjusting method according to claim 7, wherein the vibration information includes the vibration amplitude, the vibration frequency and the vibration duration of the image capturing device.

12. The exposure time adjusting method according to claim 11, further comprising a step:
    controlling the image capturing module to stop the exposure of a current temporary image and controlling the image capturing module to perform the exposure of another temporary image by the processing module while the processing module determines that the vibration amplitude or the vibration frequency surpasses a threshold.

13. An image capturing device, comprising:
    an image capturing module, capturing a corresponding image data based on a scene;
    a vibration sensor module, sensing a vibration state of the image capturing device and correspondingly providing a vibration information corresponding to each of a plurality of temporary images; and a processing module, controlling the image capturing module to continuously capture the plurality of temporary images and the processing module dynamically dividing the exposure time for each of the plurality of temporary images captured by the image capturing module and dynamically adjusting exposure times of the plurality of temporary images according to a photographic condition indicated by the vibration information during a period of capturing the plurality of temporary images by the image capturing module, wherein the vibration information of one of the plurality of temporary images is utilized to determine the exposure time of next one of the plurality of temporary images, and each of the plurality of temporary images being a clear image; furthermore, the processing module comprising a control module to determine a compensation value for vibrations in the plurality of temporary images; and an image integrating module, controlled by the processing module thereby integrating the plurality of temporary images based on the compensation value to generate a stored image, wherein the processing module controls the image integrating module to integrate pixels of the plurality of temporary images, which correspond to similar image objects, to generate the stored image, and when the image integrating module determines that geometric conversion parameters of an image object between a certain temporary image and a selected temporary image exceed an error threshold, the image integrating module stops integrating the certain temporary image and completes the integration between the selected temporary image and the rest of the plurality of temporary images other than the certain temporary image.

14. The image capturing device according to claim 13, wherein the exposure time for each of the plurality of temporary images is a secure shutter time determined by the exposure time of the processing module for each of the plurality of temporary images.

* * * * *